United States Patent [19]

Divine et al.

[11] Patent Number: 5,410,660
[45] Date of Patent: Apr. 25, 1995

[54] SYSTEM AND METHOD FOR EXECUTING BRANCH ON BIT SET/CLEAR INSTRUCTIONS USING MICROPROGRAMMING FLOW

[75] Inventors: James S. Divine; Charles F. Studor, both of Austin, Tex.

[73] Assignee: Motorola, Inc., Schaumburg, Ill.

[21] Appl. No.: 206,287

[22] Filed: Mar. 7, 1994

Related U.S. Application Data

[63] Continuation of Ser. No. 996,269, Dec. 24, 1992, abandoned.

[51] Int. Cl.⁶ .............................................. G06F 9/30
[52] U.S. Cl. ................................................... 395/375
[58] Field of Search ...................... 395/375, 775, 800

[56] References Cited

U.S. PATENT DOCUMENTS

| | | | |
|---|---|---|---|
| 4,334,268 | 6/1982 | Boney et al. | 395/375 |
| 4,338,661 | 7/1982 | Tredennick et al. | 395/375 |
| 4,370,729 | 1/1983 | Bosch | 395/400 |
| 4,429,361 | 1/1984 | Maccianti et al. | 395/775 |
| 4,766,531 | 8/1988 | Huntsman et al. | 395/400 |
| 4,777,587 | 10/1988 | Case et al. | 395/375 |
| 4,837,681 | 6/1989 | Fuller | 395/375 |
| 4,876,640 | 10/1989 | Shankar et al. | 364/716 |
| 4,891,754 | 1/1990 | Boreland | 395/375 |
| 4,907,192 | 3/1990 | Kaneko | 395/375 |
| 4,933,897 | 6/1990 | Shankar et al. | 395/550 |
| 4,947,369 | 8/1990 | Thoma et al. | 395/375 |
| 5,142,630 | 8/1992 | Ishikawa | 395/375 |
| 5,203,006 | 4/1993 | Taniai | 395/800 |
| 5,210,833 | 5/1993 | Kaneko | 395/375 |

OTHER PUBLICATIONS

"68HC11 Reference Manual" published by Motorola, Inc. in 1989, pp. A-14, A-16 through A-20, A-23, A-25 through A-29, A31, A-33.

Primary Examiner—Parshotam S. Lall
Assistant Examiner—Viet Vu
Attorney, Agent, or Firm—Elizabeth A. Apperley

[57] ABSTRACT

A data processing system (10) executes a branch instruction in a straight line microcode sequence. During execution of the instruction, a control unit (56) is provided to decode the instruction to provide a plurality of control signals and to determine a data value with which to test a condition of the instruction. A constants generation circuit (222) generates a mask value in response to the plurality of control signals. An arithmetic logic unit (224) logically combines the mask value with the data value to produce a masked value. A zero detect circuit (246) subsequently tests the masked value to determine if it is equal to zero and provides a condition signal to indicate if the condition of the instruction was satisfied. If the condition of the instruction is satisfied, an offset value plus one is added to a program counter value. Otherwise, the program counter value is incremented by one.

19 Claims, 4 Drawing Sheets

SYSTEM AND METHOD FOR EXECUTING BRANCH ON BIT SET/CLEAR INSTRUCTIONS USING MICROPROGRAMMING FLOW

This application is a continuation of prior application Ser. No. 07/996,269, filed Dec. 24, 1992 now abandoned.

FIELD OF THE INVENTION

This invention relates generally to an instruction in a data processor, and more particularly to a branch instruction in a data processor.

BACKGROUND OF THE INVENTION

Branch instructions are a part of the instruction set of most data processors and generally allow a user of the data processor to provide a choice in software program. The choice results in either maintaining a current flow of the software program or moving ("branching") to a different part of the software program. Branch instructions allow the user to have greater flexibility when using the data processor.

Typically, branch instructions are classified as either conditional or unconditional. In conditional branch instructions, a certain condition must be met before a branch operation is performed. For example, a user may specify that a branch operation occur if a predetermined bit is set or is clear, if a data value is equal to a data value in storage, or if a bit in a status register is set. The conditional branch operations discussed herein are provided by way of example only and should not be limited to these conditions.

While providing flexibility, conditional branch instructions typically require a significant amount of circuit area in a data processor. In most implementations, a separate logic circuit is required to execute a conditional branch operation. For example, in the implementation described in U.S. Pat. No. 4,947,369 by Nandor G. Thoma et al., a first programmable logic array (PLA) decodes software instructions for non-branch operations. A condition indicating circuit is also provided to supply signals which indicate whether the results of arithmetic and logic operations in the data processor fulfill certain conditions. A PLA which is responsive to the decision in a conditional branch instruction is then used to evaluate whether a condition has been met or not. A branch PLA responds to the outputs of the condition PLA to produce a branch type microword sequence if the conditions are met. Otherwise, the data processor evaluates a next instruction in the software program code.

While this method performs branch operations quickly, a significant amount of circuit area in the central processing unit (CPU) of the data processor is used to implement the branch PLA. In implementations which require small circuit areas, the branch PLA may prohibit other features from being added to the data processor.

Additionally, the instruction flow of a branch instruction being executed by the data processor is not executed in a straight line sequence. The branch PLA generates the microword sequence for branch operations and the first PLA generates the microword sequence for all other operations. Because two PLA's are used to generate microword sequences for operation of the data processor, additional circuitry is required to sequence and control use of both the PLA's. Again, more circuitry and, therefore, circuit area is required to implement conditional branch operations.

Therefore, a need exists in cost sensitive microprocessors for a system or method for performing conditional branch operations in a data processor which requires less circuit area than conventional implementations. The system or method should also execute conditional branch operations quickly and inexpensively.

SUMMARY OF THE INVENTION

The previously mentioned needs are fulfilled with the present invention. Accordingly, there is provided, in a first form, a method for executing a branch instruction. A first step includes receiving a program counter value. The program counter value pointing to an address of a branch instruction. The branch instruction is accessed in response to the program counter value. The branch instruction has a first portion for indicating a condition to be evaluated and a second portion for indicating a branch offset value. A data value is determined in response to the branch instruction. The first portion of the branch instruction is decoded to provide a plurality of control signals. A mask value is generated in response to a first one of the plurality of control signals. The mask value is logically combined with the data value to form a masked data value. The masked data value is tested to determine if the masked data value is equal to a first predetermined value. A condition detect signal is generated in response to the testing of the masked data value. The condition detect signal is asserted if the condition is satisfied and is negated if the condition is not satisfied. The address of the branch instruction is incremented by a second predetermined value to produce an incremented address. The incremented address is added to the branch offset value to produce a branch address if the condition detect signal is asserted. The branch address is stored as the program counter value if the condition detect signal is asserted. The incremented address is stored as the program counter value if the condition detect signal is negated.

There is provided, in a second form, a data processing system for executing a branch instruction. The branch instruction has a first portion for indicating a condition to be evaluated and a second portion for indicating a branch offset value. The data processing system includes an input circuit for receiving the branch instruction. A control unit is coupled to the input circuit for receiving the branch instruction. The control unit determines a data value in response to the branch instruction and decodes the first portion of the branch instruction to provide a plurality of control signals. The data processing system also includes a constant generation logic circuit for generating a mask value in response to a first one of the plurality of control signals. An arithmetic logic unit is provided for logically combining the mask value with the data value to form a masked data value. The arithmetic logic unit has a first input coupled to the constant generation logic circuit and has a second input coupled to the control unit for receiving the data value. A zero detect circuit is coupled to the arithmetic logic unit for testing the masked data value to determine if the masked data value is equal to a predetermined value. The zero detect circuit generates a condition detect signal in response to the step of testing the masked data value. The condition detect signal is asserted if the condition is satisfied and is negated if the condition is not satisfied.

These and other features, and advantages, will be more clearly understood from the following detailed description taken in conjunction with the accompanying drawings. It is important to note the drawings are not intended to represent the only form of the invention.

DETAILED DESCRIPTION OF A PREFERRED EMBODIMENT

The present invention provides a data processing system and a method for executing conditional branch operations in a data processing system. In the method described herein, a branch programmable logic array (PLA) is not used to execute branch instructions. Rather, execution of the conditional branch operation is performed using the same programmable logic array and control circuitry as all other operations executed by the data processing system. Therefore, the circuit area typically required to implement a branch PLA may be used to provide more functionality to the data processing system.

In the embodiment of the invention described herein, a condition code register is located in an execution unit of the data processing system. The condition code register is used to store a status value corresponding to an operation executed by the data processing system. When executing a conditional branch operation, the condition code register and an arithmetic logic unit are used to determine whether or not a condition of the branch operation has been met. An appropriate status flag is either set or cleared. A circuit is then used to test the status flag to determine if the condition for executing a branch operation has been met or not. If the branch operation should be executed, an appropriate offset value is added to a current program counter value incremented by one to produce a branch address. If the branch operation should not be executed, the current program counter is incremented by one and execution of the program continues with a next instruction.

Each of the instructions executed by the data processing system is decoded by a single PLA and follows a straight line program flow rather than a branched program flow. The straight line program flow simplifies control necessary to execute the conditional branch operation without a branch PLA. Therefore, by executing the conditional branch instruction without a branch PLA, a significant amount of circuit area may be conserved.

During a following description of the implementation of the invention, the terms "assert" and "negate," and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state.

Figure 1:
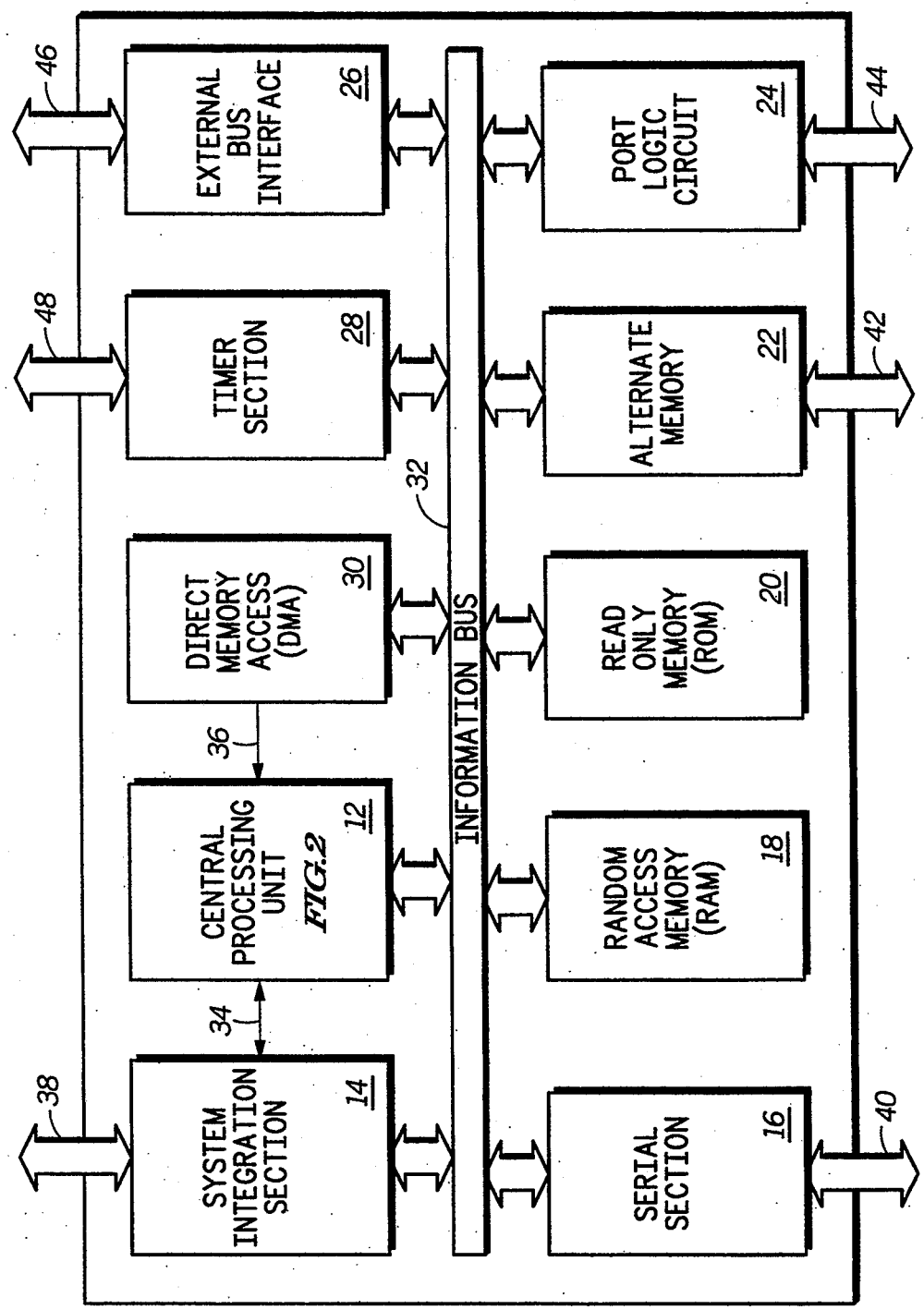
FIG. 1 illustrates in block diagram form a data processing system which implements branch operations in accordance with the present invention.

FIG. 1 illustrates one embodiment of a data processing system 10. Data processing system circuitry 10 generally includes a central processing unit (CPU) circuit 12, a system integration section of circuitry 14, a serial section of circuitry 16, random access memory (RAM) circuit 18, a read only memory (ROM) circuit 20, an alternate memory circuit 22 (e.g. electrically erasable programmable read only memory, EEPROM), a port logic circuit 24, an external bus interface circuit 26, a timer section of circuitry 28, and a direct memory access (DMA) circuit 30. Each of CPU 12, a system integration circuit 14, serial circuit 16, RAM 18, ROM 20, alternate memory circuit 22, port logic circuit 24, external bus interface circuit 26, timer circuit 28, and DMA 30 is bi-directionally coupled to an Information Bus 32. CPU 12 and system integration section 14 are bi-directionally coupled via a bus 34. Similarly, CPU 12 is coupled to DMA 30 via a bus 36.

System integration section 14 can receive and transmit signals external to data processing system 10 by way of a plurality of integrated circuit pins 38. The plurality of integrated circuit pins are not shown in detail herein. Serial section 16 can receive and transmit signals external to data processing system 10 by way of a plurality of integrated circuit pins 40. Again, the plurality of integrated circuit pins are not shown in detail herein. Depending upon the type of memory, alternate memory circuit 22 may optionally receive and transmit signals external to data processing system 10 by way of a plurality of integrated circuit pins 42 (not shown in detail herein). Port logic circuit 24 can also receive and transmit signals external to data processing system 10 by way of a plurality of integrated circuit pins 44. Additionally, external bus interface 26 can receive and transmit signals external to data processing system 10 by way of a plurality of integrated circuit pins 46. Timer section 28 can also receive and transmit signals external to data processing system 10 by way of a plurality of integrated circuit pins 48.

FIG. 1 illustrates one possible microcontroller within a family of microcontrollers. Because microcontrollers in the same family of data processors generally have a plurality of differing on-board peripherals, data processing system 10 provides only one embodiment of the invention described herein. For example, other embodiments of data processing system 10 may not have ROM 20, external bus interface 26, or DMA 30. Additionally, other co-processors may also be implemented in data processing system 10. In fact, other embodiments of data processing system 10 may have fewer, more, or different peripherals than those illustrated in FIG. 1. Additionally, in the embodiment of the invention illustrated in FIG. 1, data processing system 10 is an eight bit microcontroller which includes sixteen bit addresses and both eight bit and sixteen bit storage registers.

During operation of the embodiment of the invention illustrated in FIG. 1, system integration section 14 is used as a general controller for data processing system 10. Generally, system integration section 14 provides a plurality of control information to both enable and disable operation, to provide timing control, and to perform exception handling requirements for data processing system 10. System integration section 14 may interface directly with central processing unit 12 via bus 34, an external user via the plurality of integrated circuit pins 38, and with each of a remaining plurality of components of data processing system 10 via Information bus 32.

In data processing system 10, DMA 30 allows direct communication of data between memory internal to data processing system 10 and a plurality of peripheral devices (not shown). DMA 30 may be optionally implemented on data processing system 10 when a user requires a fast memory access method. Use and implementation of direct memory access circuits are well known in the data processing art and will not be discussed in further detail.

Timer section 28 executes a plurality of timing functions which are based on a free-running sixteen bit counter. When enabled through the plurality of integrated circuit pins 48, timer section 28 may function to perform an input-capture function, an output-compare functions, a real-time interrupt, or a computer operating properly watchdog function. Implementation and use of each of these functions is well known in the data processing art and will not be discussed in further detail.

External bus interface 26 controls receipt and transmission of address and data values between an external user or external peripheral device and data processing system 10. External bus interface 26 communicates a plurality of address and data values to a remaining portion of data processing system 10 via Information bus 32.

Port logic circuit 24 controls operation and functionality of each one of the plurality of integrated circuit pins 44. Port logic circuit 24 configures the plurality of integrated circuit pins 44 to function either as general purpose input/output pins in a first mode of operation. In a second mode of operation, port logic circuit 24 may use each of the plurality of integrated circuit pins 44 to communicate multiplexed address and data information.

RAM 18, ROM 20, and alternate memory 22 function to store information necessary for the proper operation of data processing system 10. Additionally, other data and address values may be stored therein if specified in a user program.

Serial section 16 communicates serial digital data between data processing system 10 and an external user or an external peripheral device. The serial digital data and appropriate control signals are communicated via the plurality of integrated circuit pins 40.

Figure 2:
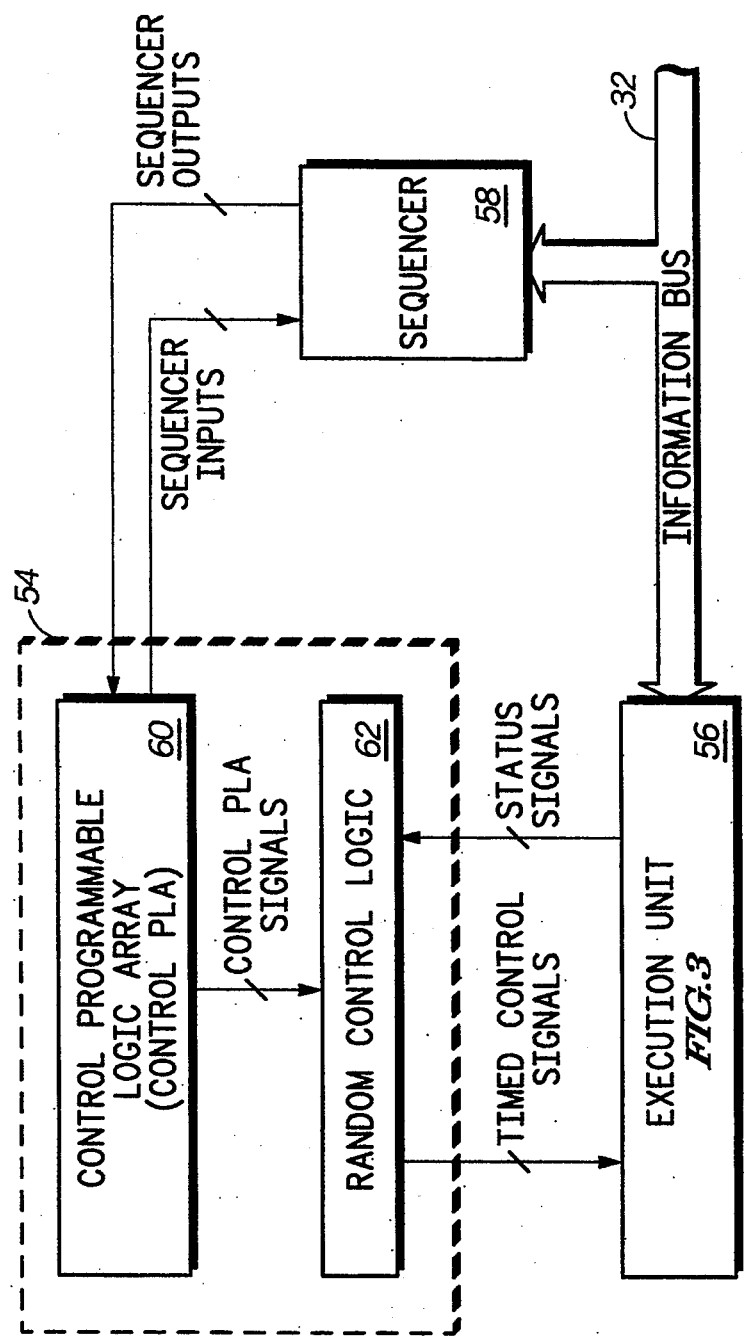
FIG. 2 illustrates in block diagram a central processing unit of FIG. 1.

CPU 12 executes a plurality of instructions during operation of data processing system 10. Although many instructions may be executed in data processing system 10, the discussion herein will concentrate on conditional branch instructions. FIG. 2 illustrates CPU 12 in more detail. CPU 12 is basically divided into three major portions. The three major portions include a control unit 54, and execution unit 56, and a sequencer 58.

Control unit 54 includes a control programmable logic array (control PLA) circuit 60 and a random control logic circuit 62. In control unit 54, control PLA 60 is connected to random control logic circuit 62 to transfer a plurality of signals, collectively labeled Control PLA signals. Random control logic 62 is connected to execution unit 56 to both transfer a plurality of Timed Control signals and to receive a plurality of status signals collectively labeled "Status signals." Control PLA 60 is connected to sequencer 58 to both transfer a plurality of signals labeled "Sequencer Output" and to receive a plurality of signals labeled "Sequencer Input." Both execution unit 56 and sequencer 58 are coupled to Information bus 32.

During operation of CPU 12, sequencer 58 receives instructions from Information bus 32. Sequencer 58 determines a state sequence of an instruction which is provided to control unit 54. The state sequence is provided to control PLA 60 of control unit 54 via the plurality of Sequencer Output signals. Upon receipt of the state sequence, control PLA 60 decodes the instruction to provide the plurality of Control PLA signals to random control logic 62. Control PLA 60 also provides the plurality of Sequencer Input signals to sequencer 58 to provide feedback about execution of the instruction. Random control logic 62 provides timing control to each of the plurality of Control PLA signals to provide the plurality of Timed Control signals to execution unit 56. Execution unit 56 performs each of the functions necessary to execute the instruction and subsequently provides the plurality of Status signals to random control logic 62 to indicate a state of CPU 12. In general, CPU 12 receives and decodes instructions to provide a plurality of control signals, executes the instruction in response to the plurality of control signals, and then provides feedback about execution of the instruction such that a new instruction may be received and executed.

Figure 3:
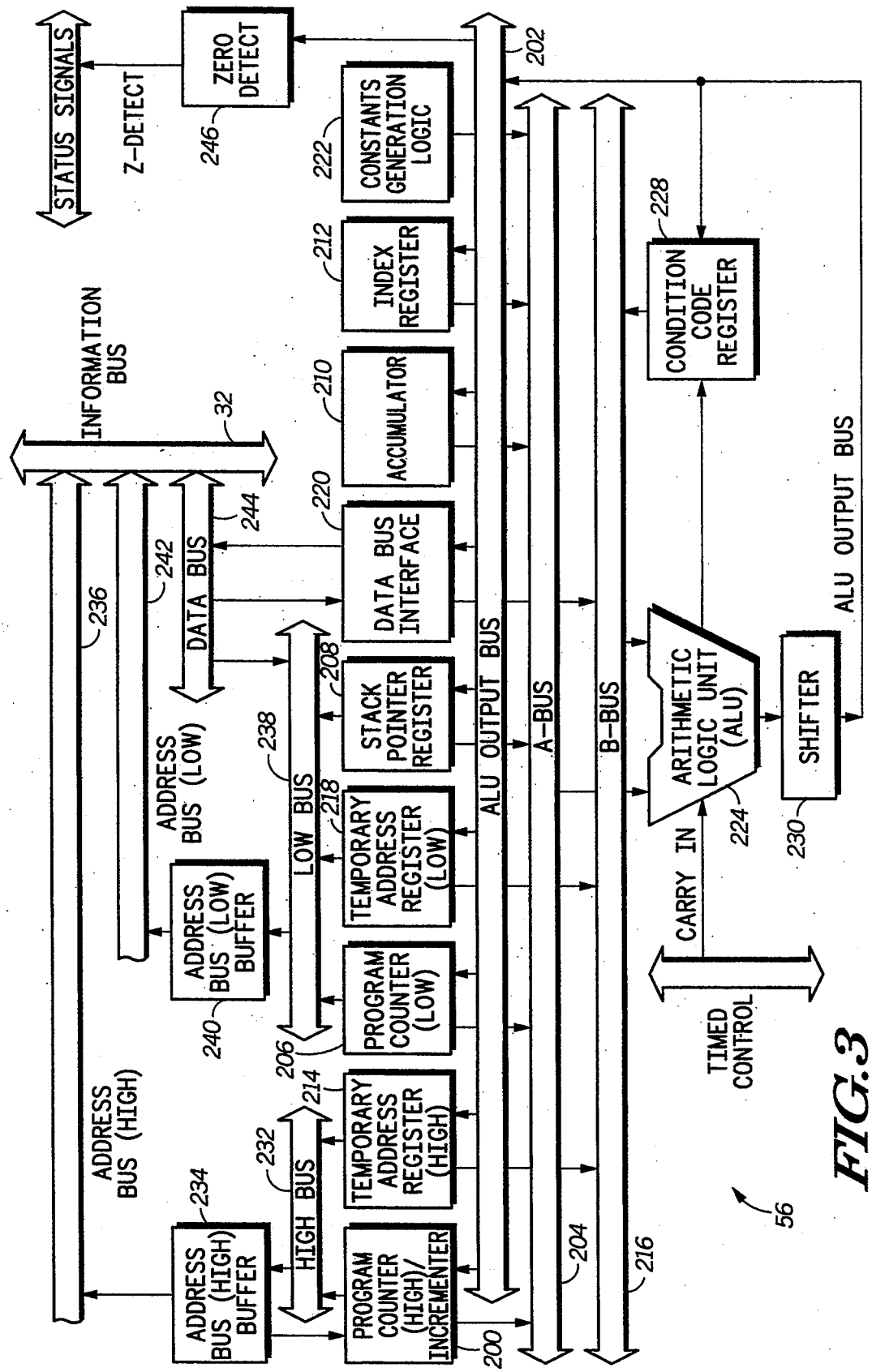
FIG. 3 illustrates in block diagram form a portion of an execution unit of FIG. 2.

A portion of execution unit 56 is illustrated in greater detail in FIG. 3. Generally, the portion of execution unit 56 includes a program counter (high)/incrementer register 200, a program counter (low) 206, a stack pointer register 208, an accumulator 210, an index register 212, a temporary address register (high) 214, a temporary address register (low) 218, a data bus interface 220, a constants generation logic circuit 222, an arithmetic logic unit (ALU) 224, a condition code register 228, as shifter 230, an address bus (high) buffer 234, an address bus (low) buffer 240, and a zero detect circuit 246. In this implementation of execution unit 56, FIG. 3 does not illustrate all circuitry which might be included in an execution unit. Rather, execution unit 56 includes the circuitry which is considered to be relevant to the embodiment of the invention described herein.

In execution unit 56, Information bus 32 communicates a plurality of data values to a Data bus 244. Information bus 32 also communicates a plurality of address values to an Address bus (high) 236 and an Address bus (low) 242. A high byte of an address value is provided to Address bus (high) 236 and a low byte of an address value is provided to Address bus (low) 242.

Data bus interface 220 is connected to Data bus 244 to both receive and transfer a plurality of data values. Data bus interface 220 is also connected to a B-Bus 216 to provide data values. Each of temporary address registers 214 and 218 are also connected to B-Bus 216 to provide address information. Similarly, each of program counter (high)/incrementer 200, program counter (low) 206, stack pointer register 208, accumulator 210, index register 212, and constants generation logic 222 is connected to an A-Bus 204 to provide address, data, or control information.

ALU 224 is connected to both A-Bus 204 and B-Bus 216. ALU 224 is also coupled to condition code register 228 and to the plurality of Timed Control signals to receive a "Carry In" signal. An output of ALU 224 is connected to shifter 230. An output of shifter 230 is labeled ALU Output bus 202. The ALU output bus 202 is connected to an input of each of condition code register 228, zero detect circuit 246, index register 212, accumulator 210, data bus interface 220, stack pointer register 208, temporary address register (low) 218, program counter (low) 206, temporary address register (high) 214, and program counter (high)/incrementer 200.

Condition code register 228 is also coupled to B-Bus 216 and to ALU 224. Zero detect circuit 246 is provides a Z-detect signal to the plurality of Status signals. Each of program counter (low) 206, temporary address register (low) 218, and stack pointer register 208 are provided to a Low bus 238. Data bus 244 is also connected to Low bus 238. Low bus 238 provides a plurality of data values to address bus (low) buffer 240. An output of address bus (low) buffer 240 is provided to an Address bus (low) 242.

Similarly, both program counter (high)/incrementer 200 and temporary address register (high) 214 are provided to a High bus 232. High bus 232 provides a plurality of data values to address bus (high) buffer 234. A first output of address bus (high) buffer 234 is provided to an Address bus (high) 236. A second output of address bus (high) buffer is connected to program counter (high)/incrementer 200. Each of Address bus (high) 236, Address bus (low) 242, and Data bus 244 are provided to Information bus 32.

During operation of data processing system 10, assume that a conditional branch instruction is provided to CPU 12. The conditional branch instruction is typically provided via a software program stored in either internal or external memory. At an appropriate point in time during execution of the software program, the conditional branch instruction is first provided to sequencer 58 (of FIG. 2). Sequencer 58 then provides the conditional branch instruction to control PLA 60 to be decoded to provide the plurality of Control PLA signals. Random control logic 62 provides the correct timing for each of the plurality of Control PLA signals and transfers each as a corresponding one of the plurality of Timed Control signals to execution unit 56.

In execution unit 56, the plurality of Timed Control signals indicates a type of conditional branch instruction to be executed in addition to a branch offset value. Additionally, the plurality of Timed Control signals provide the Carry In signal when a program counter value should be incremented during execution of the conditional branch instruction. The type of conditional branch instruction generally depends on a condition to be met. For example, the condition may be satisfied if a result of a previous calculation has a value of zero, if a certain bit is set, or if a first data value is greater than or less than a second data value. As was previously mentioned, the conditions provided herein are examples and should not provide limitations for the type of conditional branch instruction to be implemented by CPU 12 in data processing system 10. If the condition is satisfied, a program counter is modified by the branch offset value plus one to provide a branch address. The branch address allows the user to begin execution of instructions in another portion of the software program. It should be noted herein that the branch offset may be either a positive or a negative number. Therefore, the program counter may be either incremented or decremented by the branch offset value. If the condition is not met, the program counter is incremented by one and a next instruction in the software program is processed.

In the implementation of the invention described herein, ALU 224 is generally used to determine whether the condition has been met. For example, in a compare and branch if equal (CBEQ) instruction, a value provided via Data bus 244 is compared to a value in accumulator 210 by ALU 224. ALU 224 subtracts the two values and provides a result to zero detect circuit 246 via ALU Output bus 202. If the subtraction results in a zero, then the two values were equal and the branch condition has been met and the branch operation should be executed. If the subtraction results in a number other than zero, then the branch condition has not been met and the branch operation should not be executed. This and other examples will be subsequently discussed in more detail.

Figure 4:
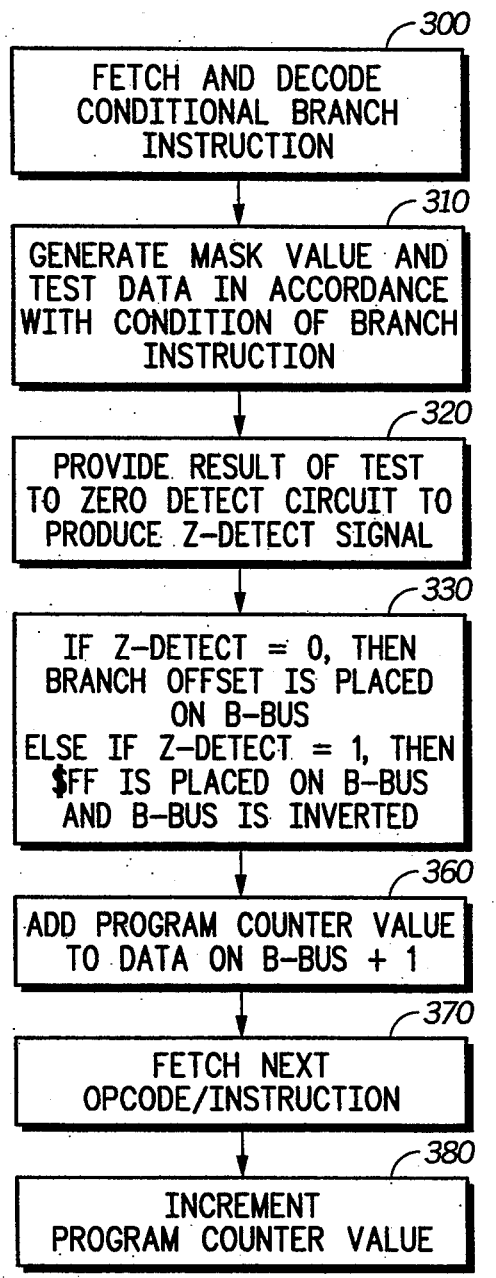
FIG. 4 illustrates in flow chart form execution of a first type of conditional branch instruction in accordance with the present invention.

The steps necessary to execute a first class of conditional branch instructions are illustrated in FIG. 4. In step 300, the conditional branch instruction is fetched and decoded. Data is then tested in accordance with a condition of the branch instruction (step 310). It should be understood that the conditions tested in the branch instruction are varied and result in a wide variety of possible conditional branch instructions. A result of the test is provided to zero detect circuit 246. Zero detect circuit 246 provides the Z-detect signal to indicate whether or not the condition has been fulfilled in step 320.

The Z-detect signal is then tested (step 330) If the Z-detect signal is equal to zero, a branch offset value is placed on B-bus 216. If the Z-detect signal is not equal to zero, B-bus 216 is precharged to a value of $FF and then inverted to have a value of $00. The program counter value is then added to the data on B-bus 216 plus one to indicate an address of a next address to be fetched (step 360). The address of the next instruction to be executed is then fetched and decoded in step 370 and the program counter is subsequently incremented (step 380).

Figure 5:
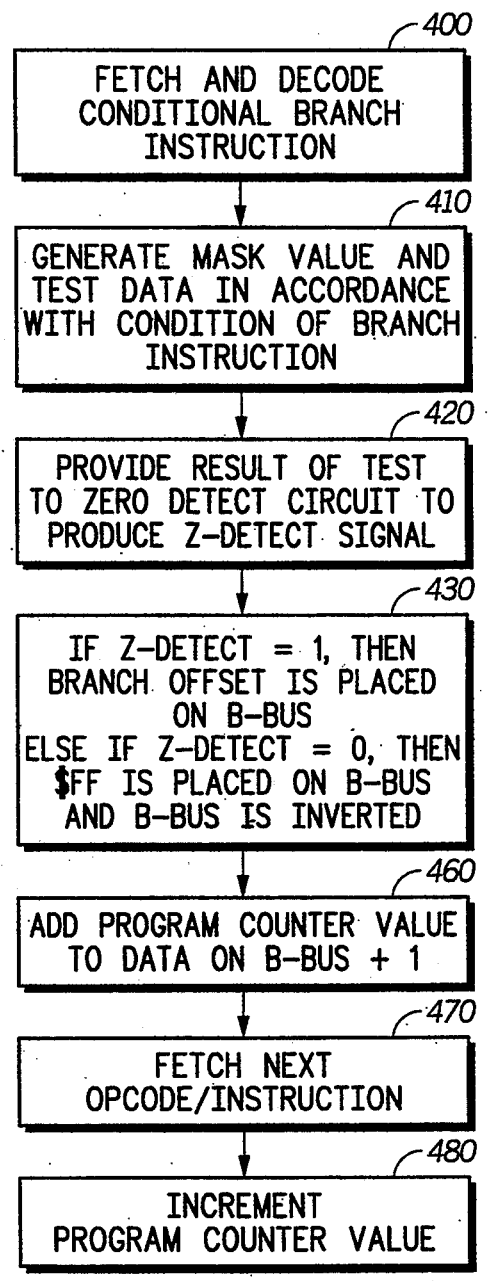
FIG. 5 illustrates in flow chart form execution of a second type of conditional branch instruction in accordance with the present invention.

FIG. 5 illustrates the steps necessary to execute a second class of conditional branch instructions. The conditional branch instruction is fetched and decoded (step 400). Data is then tested in accordance with a condition of the branch instruction in step 410. A result of the test is provided to zero detect circuit 246 in step 420 of the second class of conditional branch instructions. Zero detect circuit 246 provides the Z-detect signal to indicate whether or not the condition has been fulfilled (step 430).

If the Z-detect signal is equal to one, an offset value is placed on B-bus 216. If the Z-detect signal is equal to zero, B-bus 216 is precharged to a value of $FF and then inverted to have a value of $00. The program counter value is then added to the data on B-bus 216 plus one to indicate an address of a next address to be fetched (step 460). A next address is fetched and decoded (step 470). The program counter is subsequently incremented in step 480.

As is illustrated in FIG. 4 and FIG. 5, both types of conditional branch operations are executed without use of a branch PLA and with a straight-line software program flow. When a condition has been tested, either a branch offset value of an hexadecimal value of $FF is put on B-Bus 216. If the first type of conditional branch operation is being executed, the plurality of Timed Control signals enable execution unit 56 to invert B-bus 216 if the condition is not met and the branch operation should not be executed. Similarly, the plurality of Timed Control signals enable execution unit 56 to put the offset value on B-bus 216 and assert the Carry In signal if the condition has been met. Similarly, if the second type of conditional branch operation is being executed, the plurality of Timed Control signals enable execution unit 56 to invert B-bus 216 if the condition is met and the branch operation should be executed. Similarly, the plurality of Timed Control signals enable execution unit 56 to put the offset value on B-bus 216 and assert the Carry In signal if the condition has not been met. Then, independent of the value on B-bus 216 and of the type of conditional branch instruction being executed, ALU 224 adds the value of the B-bus 216 to the program counter value on A-bus 204. Subsequently, the result is stored in program counters 200 and 206 to be used to access a next instruction.

In an example of one of the first class of conditional branch instructions, assume a branch if a bit is set (BRSET n) instruction is provided to CPU 12. The BRSET instructions results in a branch operation if a bit (n) is set in a data value at a memory location specified in the instruction.

To begin, the BRSET instruction is first provided to sequencer 58 (of FIG. 2). Sequencer 58 provides the BRSET instruction to control PLA 60 where the instruction is decoded to provide the plurality of Control PLA signals. Random control logic 62 then provides the correct timing for each of the plurality of Control PLA signals and transfers the plurality of Timed Control signals to execution unit 56.

In execution unit 56, the plurality of Timed Control signals indicate both that a BRSET instruction is to be executed and a branch offset value to be added if the condition of the BRSET instruction is true. Discussion of execution of the BRSET instruction to this point corresponds to step 300 of FIG. 4.

Upon receipt of the plurality of Timed Control signals by CPU 12, an operand specifying an address of the data value to be tested is provided to both address register low 218 and address register high 214. The low and high bytes of the address of the data value are respectively provided to address bus (high) buffer 234 and address bus (low) buffer 240. Address bus (high) buffer 234 and address bus (low) buffer 240 then provide the address of the data value to Information Bus 32 via Address Bus (high) 236 and Address Bus (low) 242, respectively.

The address value is used to access a data value in a memory circuit such as RAM 18, ROM 20, or alternate memory 22 (of FIG. 1). The data value is provided to execution unit 56 via Information Bus 32. Information Bus 32 transfers the data value to data bus interface 220 via Data Bus 244.

Assume in the example of the BRSET instruction described herein, that a user is testing to determine whether or not bit 0 of the data value is set to a logic one value. The plurality of Timed Control signals subsequently enable constants generation logic 222 to generate a mask value having a hexadecimal value of $FE. The mask value of $FE has bit 0 cleared and all other bits asserted and is generated to mask the data value stored in one of the memory circuits in data processor 10.

The mask value is then output to A-bus 204. An inversion circuit (not shown) subsequently inverts the mask value such that only bit 0 is asserted. At the same time that constants generation logic 222 generates the mask value and provides the mask value to A-Bus 204, data bus interface 220 is enabled to provide a data value to B-bus 216. ALU 224 performs a bit wise logical AND function with the contents of both A-bus 204 and B-bus 216 to provide a result which is output via ALU Output bus 202. The previous discussion corresponds to step 310 of FIG. 4.

The result is then provided to zero detect circuit 246 (step 320 of FIG. 4). Zero detect circuit 246 subsequently determines whether or not the result is equal to zero. If the result is equal to zero, the Z-detect signal is asserted and provided to random control logic 62 via the plurality of Status signals. Similarly, if the result is equal to one, the Z-detect signal is negated and provided to random control logic 62 via the plurality of Status signals. Random control logic 62 subsequently provides the plurality of Timed Control signals in response to the Z-detect signal such that the branch instruction may be executed.

While zero detect circuit 246 is determining whether or not the result is equal to zero, A-bus 204 is precharged to a hexadecimal value of $FF. An inversion circuit subsequently inverts the contents of A-bus 204 to a hexadecimal value of $00. The offset value provided to execution unit 56 as part of the BRSET instruction is output to B-bus 216 via data bus interface 220. The offset value is provided to data bus interface 220 via Data bus 244.

ALU 224 adds the contents of both A-bus 204 and B-bus 216 to provide a sum which is output via ALU Output bus 202. The sum is then stored in temporary address register (low) 218.

Subsequently, in response to the plurality of Timed Control signals, program counters 200 and 206 output a program counter value to A-bus 204. B-bus 216 is precharged to a hexadecimal value of $FF. The plurality of Timed Control signals then enable temporary address register (low) 218 to output the branch offset value to B-bus 216 if the Z-detect signal is negated; if the Z-detect signal is asserted, the branch offset value is not output and the $FF currently stored in on B-bus 216 is inverted via an inversion circuit (not shown). Additionally, the plurality of Timed Control signals provide an asserted Carry In signal to ALU 224.

ALU 224 then adds the contents of A-bus 204, the contents of B-bus 216, and the Carry In signal in a step which corresponds to step 360 of FIG. 4. By adding the contents of temporary address register (low) 218 to the program counter value plus one for the Carry In signal, the program counter value is incremented to a branch address value. Similarly, by adding a hexadecimal value of $$00 to the program counter value plus one, the branch operation is not executed and a next instruction is fetched. In either situation, a next opcode is fetched (step 370) and the program counter value is incremented (step 380).

In an example of one of the second class of conditional branch instructions, assume a branch if not equal to zero (BNE) instruction is provided to CPU 12. The BNE instructions results in a branch operation if two values were not equal in a previous compare or subtract operation. If the values were not equal, a Z bit in condition code register 228 is clear. Therefore, the Z bit in condition code register 228 is tested and a decision to branch is subsequently determined.

To begin, the BNE instruction is first provided to sequencer 58 (of FIG. 2). Sequencer 58 provides the BNE instruction to control PLA 60 where the instruction is decoded to provide the plurality of Control PLA signals. Random control logic 62 then provides the correct timing for each of the plurality of Control PLA signals and transfers the plurality of Timed Control signals to execution unit 56.

In execution unit 56, the plurality of Timed Control signals indicate both that a BNE instruction is to be executed and a branch offset value to be added if the condition of the BNE instruction is true. Discussion to this point has corresponded to step 400 of FIG. 5.

Upon receipt of the plurality of Timed Control signals by CPU 12, constants generation logic 222 generates a mask value having a hexadecimal value of $FD. The mask value is output to A-bus 204. The inversion circuit subsequently inverts the mask value such that only bit 1 is set. At the same time that constants generation logic 222 generates the mask value and provides the mask value to A-bus 204, condition code register 228 is enabled to provide a condition code value to B-bus 216. ALU 224 then performs a bit wise logical AND function of the contents of both A-bus 204 and B-bus 216 to provide a result which is output via ALU Output bus 202 (step 410 of FIG. 5).

The result is then provided to zero detect circuit 246 (step 420 of FIG. 5). Zero detect circuit 246 subsequently determines whether or not the result is equal to zero. If the result of the two bit 1 values is equal to zero, the Z-detect signal is asserted and provided to random control logic 62 via the plurality of Status signals. Similarly, if the result of the two bit 1 values is equal to one, the Z-detect signal is negated and provided to random control logic 62 via the plurality of Status signals. Random control logic 62 subsequently provides the plurality of Timed Control signals in response to the Z-detect signal such that the BNE instruction may be executed. The plurality of Timed Control signals also provides an asserted Carry In signal in response to execution of the BNE instruction.

While zero detect circuit 246 is determining whether or not the result is equal to zero, A-bus 204 is precharged to a hexadecimal value of $FF. The offset value provided to execution unit 56 as part of the BNE instruction is output to B-bus 216.

ALU 224 adds the contents of both A-bus 204 and B-bus 216 to provide a sum which is output via ALU Output bus 202. The sum is then stored in temporary address register (low) 218. Subsequently, program counters 200 and 206 output a program counter value to A-bus 204. B-bus 216 is precharged to a hexadecimal value of $FF. The plurality of Timed Control signals enable temporary address register (low) 218 to output the branch offset value to B-bus 216 if the Z-detect signal is asserted; if the Z-detect signal is negated, the branch offset value is not output to B-bus 216 and the $FF currently stored on B-bus 216 is inverted by the inversion circuit (not shown).

ALU 224 adds the contents of A-bus 204, the contents of B-bus 216, and the Carry in signal(step 460 of FIG. 5). By adding the contents of temporary address register (low) 218 to the program counter value plus one for the Carry In signal, the program counter value is incremented to a branch address value. Similarly, by adding a hexadecimal value of $00 to the program counter value plus one, the branch operation is not executed and a next instruction is fetched. A next opcode is subsequently fetched (step 470) and the program counter value is incremented (step 480).

In the embodiments of the invention illustrated herein, conditional branch operations are executed without use of a branch PLA and with a straight-line software program flow. Although the conditions to be tested may vary according the specifications of the conditional branch instruction, all instructions pass through a similar instruction flow once the condition has been tested.

Once the condition has been tested, a zero detect circuit is used to determine whether the condition has been met. Subsequently, depending on a type of conditional branch instruction being executed, either a branch offset value or an hexadecimal value of $FF is put on B-Bus 216. As was previously stated, if the first type of conditional branch operation is being executed, the plurality of Timed Control signals enable execution unit 56 to invert B-bus 216 if the condition is not met and the branch operation should not be executed. Similarly, the plurality of Timed Control signals enable execution unit 56 to put the offset value on B-bus 216 if the condition has been met. If the second type of conditional branch operation is being executed, the plurality of Timed Control signals enable execution unit 56 to invert B-bus 216 if the condition is met and the branch operation should be executed. The plurality of Timed Control signals enable execution unit 56 to put the offset value on B-bus 216 if the condition has not been met. Then, independent of the value on B-bus 216 and of the type of conditional branch instruction being executed, ALU 224 adds the value of the B-bus 216 to the program counter value on A-bus 204. Subsequently, the result is stored in program counters 200 and 206 to be used to access a next instruction.

During discussion of the BNE instruction, only a single bit in condition code register 228 (the Z bit) was masked to determine whether of not the condition of the branch instruction was satisfied. In other branch instructions which are more complex, other bits must be masked. For example, in a "branch if greater than" (BGT) instruction, three bits of the condition code stored in condition code register 228 must be tested to determine if the condition of the BGT instruction has been satisfied. In the case of the BGT instruction, the condition to be met may be determined using the Boolean formula:

$$Z \cdot (N \oplus V) = 0. \tag{1}$$

In equation (1), Z indicates whether or not a result of a previous calculation is zero, N indicates whether the result was negative, and V indicates if an overflow was generated during calculation of the result. Therefore, for a branch operation to occur, either the Z bit or the $(N \oplus V)$ term must be equal to zero.

In prior art solutions to a BGT instruction, each of the three bits required to determine a result of the BGT instruction would have been provided to a branch PLA. The branch PLA would then provide control and timing signals necessary to execute the branch instruction. However, in the implementation of the invention described herein, a mask value may be generated by constants generation logic 222 to determine whether or not the condition of the BGT instruction has been met. Therefore, a branch PLA and the associated control and timing information would not be needed.

Constants generation logic 222 is able to generate a single mask value because of the assignation of bit values in condition code register 228. Specifically, bit 5 of the status value stored in condition code register 228 is equal to the value of N "exclusively or'ed" with V $(N \oplus V)$. As was previously mentioned in the BNE instruction example, bit 1 of the status value stored in condition code register 228 is the Z bit. Therefore, by generating a mask value which, when inverted, will test whether either bit 1 or bit 5 of the status value is equal to zero, the condition of the BGT instruction may be tested without the use of a branch PLA.

In the case of a BGT instruction, such a mask value would equal a hexadecimal value of $DD. In the hexadecimal value of $DD, both bit 5 and bit 1 are set to zero. Before being compared to the status value stored in condition code register 228, the mask value is inverted such that both bit 5 and bit 1 are equal to one. Therefore, when ALU 224 performs a bit wise logical AND function between the mask value and the status value in condition code register 228, a value other than zero will only be generated if either the Z bit or the (N⊕V) term is not equal to zero. Otherwise, ALU 224 provides an output to zero detect circuit 246. In the case of the BGT instruction, if the Z-detect signal provided by zero detect circuit 246 is asserted, an offset plus one is added to the current value in the program counter. If the Z-detect signal is negated, the current value in the program is incremented by one.

A "branch if less than or equal to" (BLE) instruction has a same mask value as the BGT instruction. However, during execution of the BLE instruction, if the Z-detect signal is negated, an offset plus one is added to the current value in the program counter. If the Z-detect signal is asserted, the current value in the program is incremented by one.

A table illustrating a portion of the branch instructions which may be implemented using the embodiment of the invention described and mask values corresponding to each is provided below in Table 1. It should be understood that the branch instructions provided herein are provided by way of example and should not limit the scope of the invention. Additionally, the branch instructions will be divided into the first and second class of conditional branch instructions previously described.

data value retrieved from a memory circuit (BRSET). Additionally, Table 1 illustrates both the first and second classes of conditional branch instructions and the complementary relationship of each.

As has been previously illustrated, each of the conditions being tested and the subsequent branch operation executed in response to the conditions may be executed by execution unit 56 without the use of a branch PLA. Because no branch PLA is used and a straight line program sequence was developed, the embodiments of the invention described herein allow for more efficient execution of conditional branch operations. Circuit area is conserved and conditional branch instructions are executed in a timely manner.

The implementation of the invention described herein is provided by way of example only. However, many other implementations may exist for executing the function described herein. For example, while only the Z bit was tested in condition code register 228, other bits might also be tested depending on the application desired by the user. In any case the same straight line programming sequence may be used. Additionally, conditional branch instructions having a wide variety of conditions to be tested may be implemented using the instruction flow described herein. The conditions to be tested again depend on the needs of the designer of the system. For example, branch instructions which compare an operand from a memory with the contents of an accumulator may also be implemented. Additionally, branching instructions which test when values are greater than, greater than or equal to, less than, and less than or equal to may also be executed using the circuit and method described herein. While circuitry may have to be added to the CPU section of the data processing system to perform the conditional testing of each of these variations of branch instructions, a result of whether or not the condition is met is always determined by the zero detect circuit. Therefore, the calculation of a branch address value as disclosed herein for the first and second classes of conditional branch instruction is the same for each variation of conditional branch instructions. No interruption in program or added circuitry is required to implement the conditional branch instruction after the condition of the instruction has been tested.

As was previously stated, the data processing system 10 illustrated in FIG. 1 is but one embodiment of a microprocessor which may be used to implement an embodiment of the invention. Data processing system 10 may have fewer, more, or different peripherals than those illustrated in FIG. 1. For example, the execution unit illustrated in FIG. 3 is one embodiment of a portion of an execution unit which may be implemented in the data processing system described herein. If a remaining

TABLE 1

| First Class of Conditional Branch Instructions | | | | Second (Complementary) Class of Conditional Branch Instructions | | | |
|---|---|---|---|---|---|---|---|
| Test | Boolean | Mnemonic | Mask | Test | Boolean | Mnemonic | Mask |
| r>m | $Z \cdot ((N \oplus V)) = 0$ | BGT | $DD | r≤m | $Z \cdot ((N \oplus V)) = 1$ | BLE | $DD |
| r≧m | $((N \oplus V)) = 0$ | BGE | $DF | r<m | $((N \oplus V)) = 1$ | BLT | $DF |
| r=m | $Z = 1$ | BEQ | $FD | r≠m | $Z = 0$ | BNE | $FD |
| r>m | $C \cdot Z = 0$ | BHI | $FC | r≤m | $C + Z = 1$ | BLS | $FC |
| Carry | $C = 1$ | BCS | $FE | No Carry | $C = 0$ | BCC | $FE |
| Minus | $N = 1$ | BMI | $FB | Plus | $N = 0$ | BPL | $FB |
| Interrupt | $IRQ = 1$ | BIH | $BF | No Interrupt | $IRQ = 0$ | BIL | $BF |

In Table 1, "r" refers to a value stored in a register such as accumulator 210 or index register 212. Additionally, "m" refers to an operand stored in a memory circuit such as RAM 18, ROM 20, and alternate memory 22. Additionally, "C" refers to a carry (C) bit in condition code register 228 and IRQ refers to an interrupt (IRQ) bit in condition code register 228. The C bit indicates whether a carry was generated in a previous operation and the IRQ bit indicates if an external interrupt signal is being provided to data processor 10. The mnemonics described herein are generally well known in the data processing art and will not be described in further detail.

Table 1 illustrates that for each of the conditional branch instructions, a mask value may be generated which will mask a portion of the value being tested to determine whether or not a branch operation should be executed. The value being tested may be provided by condition code register 228 (BEQ, BGT) or may be a portion of the execution were illustrated, other circuitry might be included. The circuitry might include a second index register for storing the high byte of the index pointer and a second stack pointer register for storing the high byte of the stack pointer.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A method for executing a branch instruction, comprising the steps of:
   receiving a program counter value, the program counter value pointing to an address of a branch instruction;
   accessing the branch instruction in response to the program counter value, the branch instruction having a first portion for indicating a condition to be evaluated and a second portion for indicating a branch offset value;
   using a programmable logic array to decode the first portion of the branch instruction both to access a series of instructions used during execution of the branch instruction and to provide a plurality of control signals, the programmable logic array being used to decode a plurality of instructions which include but are not limited to the branch instruction;
   providing a plurality of sequence inputs wherein each of the plurality of sequence inputs corresponds to one of the series of instructions;
   providing the sequence inputs to a state sequencer, the state sequencer using each of the plurality of sequence inputs to control execution of the branch instruction;
   determining a data value in response to a first one of the plurality of control signals;
   generating a mask value in response to a second one of the plurality of control signals;
   logically combining the mask value with the data value to form a masked data value;
   testing the masked data value to determine if the masked data value is equal to a first predetermined value;
   generating a condition detect signal in response to the step of testing the masked data value, the condition detect signal being asserted if the condition is satisfied and being negated if the condition is not satisfied;
   incrementing the address of the branch instruction by a second predetermined value to produce an incremented address;
   adding the incremented address to the branch offset value to produce a branch address if the condition detect signal is asserted; and
   storing the branch address as the program counter value if the condition detect signal is asserted and storing the incremented address as the program counter value if the condition detect signal is negated.

2. The method of claim 1 wherein the step of logically combining is a bit-wise logical AND function.

3. The method of claim 1 wherein the step of logically combining is a bit-wise logical OR function.

4. The method of claim 1 wherein the first predetermined value is equal to zero.

5. The method of claim 1 wherein the data value is a status value stored in a condition code register.

6. The method of claim 1 wherein the data value is accessed from a memory address in a memory circuit, the memory address being provided by a third portion of the branch instruction.

7. The method of claim 1 wherein the second predetermined value is equal to one.

8. The method of claim 1 further comprising a step of inverting the mask value before combining the mask value with the data value to form the masked data value.

9. The method of claim 1 wherein the branch instruction is one of a plurality of conditional branch instructions, each of the plurality of conditional branch instructions performing a conditional comparison operation.

10. The method of claim 9 wherein a value of the mask value is determined by the conditional comparison operation being performed by the branch instruction.

11. A data processing system for executing a branch instruction, the branch instruction having a first portion for indicating a condition to be evaluated and a second portion for indicating a branch offset value, the data processing system comprising:
   input means for receiving the branch instruction;
   a control unit coupled to the input means for receiving the branch instruction, the control unit determining a data value in response to the branch instruction the control unit using a programmable logic array to decode the first portion of the branch instruction to access a series of instructions used during execution of the branch instruction, to provide a plurality of sequence inputs wherein each of the plurality of sequence inputs corresponds to one of the series of instructions, and to provide a plurality of control signals, the programmable logic array being used to decode a plurality of instructions including, but not limited to the branch instruction;
   a state sequencer coupled to the control unit for receiving the plurality of sequence inputs, the state sequencer using each of the plurality of sequence inputs to control execution of the branch instruction;
   a constant generation logic circuit for generating a mask value in response to a first one of the plurality of control signals;
   an arithmetic logic unit for logically combining the mask value with the data value to form a masked data value, the arithmetic logic unit having a first input coupled to the constant generation logic circuit and having a second input coupled to the control unit for receiving the data value; and
   a zero detect circuit coupled to the arithmetic logic unit for testing the masked data value to determine if the masked data value is equal to a predetermined value, the zero detect circuit generating a condition detect signal in response to the step of testing the masked data value, the condition detect signal being asserted if the condition is satisfied and being negated if the condition is not satisfied.

12. The data processing system of claim 11 further comprising:
   a program counter register for storing a program counter value which points to an address of the branch instruction, the program counter register being coupled to the input means for providing the address of the branch instruction.

13. The data processing system of claim 11 wherein the data value is a status value in a condition code register.

14. The data processing system of claim 11 wherein the data value is accessed from a memory address in a memory circuit, the memory address being provided by a third portion of the branch instruction.

15. The data processing system of claim 11 wherein the arithmetic logic unit logically combines the mask value with the data value using a bit-wise logical AND function.

16. The data processing system of claim 11 wherein the arithmetic logic unit logically combines the mask value with the data value using a bit-wise logical OR function.

17. The data processing system of claim 11 wherein the predetermined value is equal to zero.

18. The data processing system of claim 11 wherein the branch instruction is one of a plurality of conditional branch instructions, each of the plurality of conditional branch instructions performing a conditional comparison operation.

19. The data processing system of claim 18 wherein the constant generation logic circuit generates the mask value in response to the conditional comparison operation being performed by the branch instruction.

* * * * *